United States Patent Office 3,472,780
Patented Oct. 14, 1969

3,472,780

LOW POROSITY NICKEL ZINC FERRITE

Andreas Leopoldus Stuijts, Eindhoven, Netherlands, assignor, by mesne assignments, to U.S. Philips Corporation, New York, N.Y., a corporation of Delaware No Drawing. Continuation of application Ser. No. 634,773, Apr. 28, 1967, which is a continuation of application Ser. No. 297,157, July 23, 1963. This application Jan. 26, 1968, Ser. No. 700,749
Claims priority, application Netherlands, July 25, 1962, 281,140
Int. Cl. C04b *35/64*; H01f *1/08*
U.S. Cl. 252—62.62 5 Claims

ABSTRACT OF THE DISCLOSURE

A high-density low porosity nickel-zinc ferrite having pores not exceeding 5μ in size is obtained by isotatically compressing a finely-divided, disagglomerated nickel-zinc ferrite powder which is then sintered.

The present application is a continuation of U.S. application Ser. No. 634,773, filed Apr. 28, 1967, now abandoned, which application is a continuation of U.S. application Ser. No. 297,157, filed July 23, 1963, now abandoned.

My invention relates to a nickel zinc ferrite body having a low porosity and to a method of manufacture of such a body.

A "ferrite" is defined as a soft magnetic material having a composition corresponding to the formula $MO \cdot x\ Fe_2O_3$ or mixed crystals having a composition $MO \cdot x\ Fe_2O_3 + ZnO \cdot y\ Fe_2O_3$ in which M is a bivalent metal, for example nickel or manganese, and $0.8 \leqq x \leqq 1.5$ and $0.8 \leqq y \leqq 1.5$. The invention relates in particular to nickel-zinc ferrites because bodies of nickel-zinc ferrite find particular use as magnetic recording heads for recording or reproducing information on a magnetic carrier. In such applications, these bodies are subjected to heavy wear.

It is a principal object of my invention to provide a nickel-zinc ferrite body suitable for use as a magnetic recording head.

Another object to my invention is to provide a nickel-zinc ferrite body having a low porosity for improving its resistance to abrasion when used as a magnetic recording head.

These and further objects of the invention will appear as the specification progresses.

In accordance with the invention, it has been found that a ferrite suitable for use as a magnetic recording head should have a low porosity in order to resist wear of the ferrite body in such application. A body having a "low" porosity is defined herein as a body having a volume of pores smaller than 3% of its external volume.

The porosity of a ferrite body is determined by measuring its apparent density, $d_s$, i.e. the weight of the body divided by its total volume which includes the pore volume, and its absolute or X-ray density $d_r$. The porosity, $p$, expressed in percentage of the total volume of the body, is thus $$p = \frac{d_r - d_s}{d_r} \times 100$$

Further, in accordance with the invention, another requirement for high resistivity to wear of the ferrite body is that the mean size of the pores (the term "size" is defined as the largest dimension measured in any direction) should be smaller than 3 microns. It is also a requirement of the invention that the pores of such bodies not be larger than 5 microns.

The ferrite bodies according to the invention are manufactured by forming a finely-divided mixture of NiO, ZnO and $Fe_2O_3$ in proportions forming a nickel-zinc ferrite suitable for use in a recording head. The mixture, which may be presintered if desired, is first pulverized into a very fine state of subdivision, i.e., to a mean particle size not exceeding 0.5 micron. During pulverization aggregates are formed in the resulting mixture and these aggregates are broken up, preferably by a propeller-mixing device. The resulting finely-divided mixture is compressed "isostatically" at a pressure of at least 0.2 ton per square centimeter. The body thus formed is then heated to a temperature of about 1200° C. to 1350° C. in order to form the ferrite.

The term "isostatic" is defined herein to mean the exertion of pressure on all sides of the powder, for example, by immersing a flexible container containing the powder into a liquid such as water and compressing the liquid, i.e., "hydrostatic compression." The liquid insures that equal pressure will be exerted upon the mass in the container from all sides.

Preferably, in accordance with the invention the oxides of NiO, ZnO and $Fe_2O_3$ are mixed in the following proportions:

| | Molecular percent |
|---|---|
| NiO | 15–35 |
| ZnO | 15–35 |
| $Fe_2O_3$ | 49–50 |

Furthermore, instead of oxides, compounds which decompose to these oxides upon heating may be employed. Also, preferably in accordance with the invention, the powder is first compressed in a pressing mold before being subjected to isostatic compression. Furthermore, heating in a temperature range from 1250° C. to 1300° C. in an oxygen atmosphere is also preferred.

Since the materials are usually ground in iron ball mills, allowance should also be made for the presence of loose iron particles in the material in determining the final composition of the product.

The invention will now be explained in greater detail with reference to the following illustrative examples.

EXAMPLE I

A mixture consisting of 11.3% by weight of NiO, 21.8% by weight of ZnO and 66.9% by weight of $Fe_2O_3$ was ground with water in a ball mill for 4 hours. After filtering and drying, the mixture was pre-sintered at a temperature of 1,030° C. for 4 hours. The pre-sintered product was pulverized and then ground with water in a ball-mill for 10 hours. The mean size of particles of the resulting ground product was 0.6 micron. This ground product was intensely ground again in the shaking mill for 48 hours to a mean size of the particles of only 0.4 micron.

To compensate for the iron ground into the product, the composition of the ground product, after analysis, was corrected to the desired value by the addition of further quantities of finely mixed oxides to maintain the desired proportions.

After filtering and drying of the ground product, a certain amount of the powder obtained was placed in a propeller-mixing-device to break up any agglomerates and then molded in a steel matrix to form a briquette. This briquette was placed into a rubber bag which was exhausted and compressed in a hydrostatic pressing vessel at a pressure of 1 ton/cm.². The briquette was then sintered in oxygen at a temperature of 1,250° C. for 24 hours. The apparent density of the resulting sintered body was 5.263 gm./cc. This means that the sintered body (having an absolute density of 5.33 gm./cc.) had a volume of pores of 1.26%.

EXAMPLE II

A dried ferrite powder obtained by pre-sintering, grinding in a ball-mill and a shaking mill, any agglomerates of which were broken up in a propeller-mixing device. filtering and drying, as described in Example I was placed in a rubber bag which was exhausted and then compressed hydrostatically at a pressure of 10 tons/cm.$^2$. The resulting briquette was sintered at a temperature of 1,230° C. for 30 minutes. The resulting sintered body had an apparent density $d_s$ of 5.255 gm./cc. Considering that the absolute density $d_r$ of the sintered body is 5.33 gm./cc., this means that the porosity of the body was 1.41%.

EXAMPLE III

A mixture consisting of 12.5% by weight of NiO, 23.0% by weight of ZnO and 64.5 by weight of $Fe_2O_3$ was ground wet in a shaking mill for 72 hours and, after filtering, dried. The mean size of particles of the powder thus obtained was 0.3 micron. In the composition of the initial mixture allowance has been made for iron particles which were later ground into the product. The resulting powder was placed in a propeller-mixing-device for 60 sceonds to break up any agglomerates. Next, it was compressed in a steel matrix to form a briquette. This briquette was placed in a rubber bag which was exhausted, closed and compressed in a hydrostatic pressing vessel at a pressure of 1 ton/cm.$^2$. The molded body was subsequently sintered at a temperature of 1,250° C. for 2 hours. The resulting sintered body had an apparent density $d_s$ of 5.20 gm./cc. and an absolute density of 5.33 gm./cc.; its porosity was therefore 2.5%

Bodies made in accordance with the invention were found to be eminently suited as recording heads because of their resistance to wear. Although this is one application for such bodies, it is apparent that they may be used wherever the body is subject to considerable abrasion due to their very low porosity.

What is claimed is:

1. A method of manufacturing a polycrystalline nickel-zinc ferrite body having a volume of pores smaller than 3% comprising the steps of forming a finely-divided mixture about 15–35 mol. percent of NiO, about 15–35 mol. percent of ZnO, and about 49–50 mol. percent of $Fe_2O_3$, pulverizing said mixture to a mean particle size not exceeding 0.5 micron, thereafter breaking up aggregates which have been formed during pulverizing, compressing said mixture isostatically at a pressure of at least 0.2 ton per square centimeter, and heating the so-compressed mixture at a temperature of about 1200° C. to 1350° C. to form said body.

2. A method as claimed in claim 1 in which the powder is compressed isostatically at a pressure of at least 1 ton per square centimeter.

3. A method as set forth in claim 1 in which the powder is compressed into a body of desired shape before being compressed isostatically.

4. A method as claimed in claim 1 in which the compressed mixture is heated at a temperature of about 1250° C. to 1300° C.

5. A method as claimed in claim 1 in which the compressed mixture is heated in an atmosphere of oxygen.

References Cited

UNITED STATES PATENTS

| | | | |
|---|---|---|---|
| 2,452,529 | 10/1948 | Shock | 252—62.62 |
| 2,703,787 | 3/1955 | Crowley | 252—62.62 |
| 3,038,199 | 6/1962 | Bartow et al. | 18—5 |
| 3,189,550 | 6/1965 | Malinofsky | 252—62.62 |

TOBIAS E. LEVOW, Primary Examiner

R. D. EDMONDS, Assistant Examiner